United States Patent
Yamaguchi et al.

(10) Patent No.: US 6,475,949 B1
(45) Date of Patent: Nov. 5, 2002

(54) PROMOTER FOR PURIFYING INTERNAL ENGINE EXHAUST AND METHOD FOR PREPARING THE SAME

(75) Inventors: Yasuhide Yamaguchi; Masatoshi Yamazaki, both of Saitama (JP)

(73) Assignee: Mitsui Mining and Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/460,373

(22) Filed: Dec. 13, 1999

(30) Foreign Application Priority Data

Dec. 11, 1998 (JP) .......................................... 10-352579

(51) Int. Cl.⁷ ................................................ B01J 23/00
(52) U.S. Cl. ........................ 502/304; 502/302; 502/303
(58) Field of Search ................................ 502/302, 303, 502/304, 340, 341, 349, 355, 414, 415, 439; 501/152, 153; 423/263, 21.1; 427/212, 126.4

(56) References Cited

U.S. PATENT DOCUMENTS

| | | | | |
|---|---|---|---|---|
| 4,996,180 A | * | 2/1991 | Diwell et al. ................ | 502/304 |
| 5,677,258 A | * | 10/1997 | Kurokawa et al. .......... | 502/303 |
| 5,958,829 A | * | 9/1999 | Domesle et al. ............ | 502/333 |
| 5,990,038 A | * | 11/1999 | Suga et al. .................. | 502/303 |
| 6,040,265 A | * | 3/2000 | Nunan ......................... | 502/242 |
| 6,150,288 A | * | 11/2000 | Suzuki et al. ............... | 501/105 |
| 6,150,299 A | * | 11/2000 | Umemoto et al. .......... | 502/304 |
| 6,165,935 A | * | 12/2000 | Williamson et al. ........ | 502/339 |
| 6,180,075 B1 | * | 1/2001 | Lindner et al. .......... | 423/213.2 |
| 6,180,558 B1 | * | 1/2001 | Kurokawa et al. .......... | 502/304 |

\* cited by examiner

*Primary Examiner*—Stanley S. Silverman
*Assistant Examiner*—Cam N. Nguyen
(74) *Attorney, Agent, or Firm*—Young & Thompson

(57) ABSTRACT

The promoter includes (A) particulate aluminum oxide and (B) a double oxide of (i) cerium and (ii) at least one member selected from the group consisting of zirconium, yttrium, strontium, barium and rare earth elements, supported on the particulate aluminum oxide. A solution of (i) a water-soluble salt of cerium and (ii) a water-soluble salt of at least one member selected from the group consisting of zirconium, yttrium, strontium, barium and rare earth elements is formed. Particulate aluminum oxide is added to the solution to form a dispersion. An aqueous solution of ammonium hydrogen carbonate is added to the dispersion to obtain particulate aluminum oxide coated with a reaction product. The particulate aluminum oxide coated with the reaction product is fired. Alternatively, an aqueous solution containing (i) the water-soluble salt of cerium and (ii) the water-soluble salt of the at least one member dissolved therein is adhered onto particulate aluminum oxide. The particulate aluminum oxide provided thereon with the aqueous solution adhered thereto is brought into contact with an aqueous solution of ammonium hydrogen carbonate to cause a reaction between these solutions and to thus deposit a reaction product on the particulate aluminum oxide. The particulate aluminum oxide with the reaction product deposit is fired.

6 Claims, No Drawings

PROMOTER FOR PURIFYING INTERNAL ENGINE EXHAUST AND METHOD FOR PREPARING THE SAME

BACKGROUND OF THE INVENTION (a) Field of the Invention

The present invention relates to a promoter useful for purifying the exhaust gases discharged from the internal combustion engines of, for instance, motorcars as well as a method for the preparation thereof. More specifically, the present invention pertains to a promoter for purifying the internal combustion engine exhaust gas as well as a method for preparing the same, wherein a cerium-containing double oxide is substituted for cerium oxide which has conventionally been used as a promoter for purifying the internal combustion engine exhaust gas and the former is supported on particulate aluminum oxide to thus improve the heat resistance of the resulting promoter and to hence prevent any reduction of the quality thereof due to thermal deterioration.

(b) Description of the Prior Art

As a catalyst for purifying the exhaust gas discharged from internal combustion engines of, for instance, motorcars, there have been used, for instance, those obtained by finely distributing noble metals such as platinum, rhodium and palladium on a carrier having a large specific surface area such as alumina. These noble metals can serve to oxidize and convert the hydrocarbons present in the exhaust gas into carbon dioxide and water and to oxidize and convert the carbon monoxide into carbon dioxide, while they also have an ability of reducing the nitrogen oxides present in the exhaust gas into nitrogen gas. In other words, they can exert a catalytic effect on both oxidation and reducing reactions to thus permit the simultaneous removal of these three components of hydrocarbons, carbon monoxide and nitrogen oxides present in the exhaust gas. It has been well known that the ratio of air to fuel (or air-fuel ratio) should be maintained constant (at the theoretical air-fuel ratio) in order to ensure this effective catalytic effect on the both reactions simultaneously.

However, the internal combustion engines of, for instance, motorcars are apt to cause rapid change in the number of revolutions and the air-fuel ratio greatly varies depending on the traveling conditions such as the accelerated conditions, reduced speed conditions and low speed-traveling and high speed-traveling conditions. For this reason, oxygen concentration changes in the exhaust gas are continuously detected or monitored using an oxygen sensor to thus always control the amount of fuel to be supplied to an engine so that the air-fuel ratio is always kept constant.

On the other hand, it is common to use a combination of a noble metal catalyst and a promoter for the purpose of preventing any reduction of the purifying ability of the catalyst due to the change in the air-fuel ratio by the chemical action of the catalyst by itself. As such a promoter, there has been used, for instance, cerium oxide. Cerium oxide has such characteristic properties that it can release and/or absorb the oxygen attached thereto and the lattice oxygen present in the cerium oxide crystals depending on the level of the oxygen partial pressure in the exhaust gas. Accordingly, if the exhaust gas has a reducing ability, cerium oxide undergoes release of oxygen ($CeO_2 \rightarrow CeO_{2-x} + 0.5 \times O_2$) and supplies oxygen to the exhaust gas to cause an oxidation reaction. On the other hand, if the exhaust gas has an oxidation ability, cerium oxide conversely incorporates oxygen into the oxygen-deficient sites of the crystals ($CeO_{2-x} + 0.5 \times O_2 \rightarrow CeO_2$) to reduce the oxygen concentration in the exhaust gas and to thus cause a reducing reaction. As has been described above, cerium oxide serves as a buffering agent which can adjust any change in the extent of oxidizing and/or reducing ability of the exhaust gas and can thus maintain purifying quality of the catalyst.

However, the promoter for purifying the exhaust gas discharged from the internal combustion engines is exposed to high temperature gases generated from the engines over a long period of time and therefore, it is apt to be easily deteriorated in its ability. In particular, cerium oxide has a low heat resistance and accordingly, undergoes sintering upon exposure to high temperature gases and the specific surface area thereof is correspondingly reduced. As a result, the initial characteristic properties peculiar to the promoter is greatly impaired or reduced. For this reason, there have been proposed various means for eliminating the foregoing drawbacks of cerium oxide as a promoter, for instance, a method in which other elements such as zirconium are added to cerium oxide to improve the heat stability thereof and a method wherein the lattice-constant of cerium oxide crystals is enlarged by the incorporation of other elements into the cerium oxide crystals to thus improve the stability of the cubic system thereof. However, there has not yet been obtained any satisfactory results.

In addition, there have widely been used a technique, in which a promoter is prepared by mixing cerium oxide with aluminum oxide (such as α-, γ- and θ-type ones). In this case, the coexistence of aluminum oxide surely has an effect of physically suppressing any sintering of the resulting mixture, but cannot suppress, at all, any sintering of cerium oxide per se.

SUMMARY OF THE INVENTION

Accordingly, it is an object of the present invention to provide a promoter for purifying the exhaust gas discharged from internal combustion engines, whose heat resistance is improved and whose quality reduction due to thermal deterioration can be suppressed, by the use of a cerium-containing double oxide in place of cerium oxide conventionally used.

As has been discussed above in detail, any sintering of cerium oxide per se cannot be suppressed even if a promoter is prepared by mixing cerium oxide with aluminum oxide. However, as a result of various repeated investigations of the inventors of this invention, it has been found that a cerium-containing double oxide having excellent heat resistance and free of any sintering can be prepared by bringing an aqueous solution containing a water-soluble salt of cerium and a water-soluble salt of a specific element, dissolved therein and keeping contact with particulate aluminum oxide, into contact with a specific precipitant to cause a reaction therebetween and to thus deposit the reaction product on the particulate aluminum oxide; and then firing the aluminum oxide to which the reaction product is adhered, to thus give the double oxide constituted by cerium, the specific element and oxygen supported on the particulate aluminum oxide.

Under such circumstances, the inventors of this invention have conducted various studies to achieve the foregoing object, have found that a promoter can be prepared by using a cerium-containing double oxide instead of cerium oxide and supporting the double oxide on the particulate high-heat-resistant aluminum oxide, the resulting promoter does not cause any reduction of its initial activity as a promoter even if it is exposed to a high temperature over a long period of time and can maintain its high quality and thus have completed the present invention on the basis of the foregoing findings.

According to an aspect of the present invention, there is thus provided a promoter for purifying internal combustion engine exhaust gas, which comprises (A) particulate aluminum oxide and (B) a double oxide of (i) cerium and (ii) at least one member selected from the group consisting of zirconium, yttrium, strontium, barium and rare earth elements, supported on the aluminum oxide.

According to another aspect of the present invention, there is provided a method for preparing a promoter for purifying internal combustion engine exhaust gas, which comprises the steps of mixing a dispersion, which contains (i) a water-soluble salt of cerium and (ii) a water-soluble salt of at least one member selected from the group consisting of zirconium, yttrium, strontium, barium and rare earth elements, dissolved therein and particulate aluminum oxide dispersed therein, with an aqueous solution of ammonium hydrogen carbonate; then reacting them to deposit the reaction product on the particulate aluminum oxide; and firing the particulate aluminum oxide to which the reaction product is adhered to thus give a promoter which comprises the particulate aluminum oxide and a double oxide of (i) cerium and (ii) at least one member selected from the group consisting of zirconium, yttrium, strontium, barium and rare earth elements, supported on the aluminum oxide.

According to a third aspect of the present invention, there is provided a method for preparing a promoter for purifying internal combustion engine exhaust gas, which comprises the steps of adhering, onto particulate aluminum oxide, an aqueous solution, which contains (i) a water-soluble salt of cerium and (ii) a water-soluble salt of at least one member selected from the group consisting of zirconium, yttrium, strontium, barium and rare earth elements, dissolved therein; bringing the particulate aluminum oxide provided thereon with the aqueous solution into contact with an aqueous solution of ammonium hydrogen carbonate to cause a reaction between these solutions and to thus deposit the reaction product on the particulate aluminum oxide; and then firing the particulate aluminum oxide to which the reaction product is adhered to thus give a promoter which comprises the particulate aluminum oxide and a double oxide of (i) cerium and (ii) at least one member selected from the group consisting of zirconium, yttrium, strontium, barium and rare earth elements, supported on the aluminum oxide.

DESCRIPTION OF THE PREFERRED EMBODIMENTS

The particulate aluminum oxide used in the present invention is preferably one having a high specific surface area and high thermal stability and specific examples of such aluminum oxides include α-alumina, θ-alumina, γ-alumina and alumina to which different kinds of elements (such as alkaline earth metals and silicon) are added. The particle size of these particulate aluminum oxides is not limited to any specific range, but is preferably not less than 10 μm in order to prevent any cohesion of aluminum oxide powder and to ensure high dispersibility, even when the powder supports the double oxide on the surface thereof.

Regarding double oxides, an effect of improving the heat resistance of the cerium oxide has been observed for a variety of double oxides constituted by cerium, various kinds of other elements and oxygen, but higher heat resistance is, in particular, observed for the double oxides of (i) cerium and (ii) at least one member selected from the group consisting of zirconium, yttrium, strontium, barium and rare earth elements (such as lanthanum, praseodymium, neodymium and ytterbium) (in this specification, these elements other than cerium will sometimes be referred to as "additive element(s)"). In the present invention, cerium oxide, which has conventionally been used as a promoter for purifying the internal combustion engine exhaust gas, is used in the form of such a double oxide. Therefore, this permits the substantial improvement of the heat resistance of the promoter and the considerable inhibition of any quality reduction thereof due to thermal deterioration.

The component ratio of the particulate aluminum oxide to the double oxide and that of the cerium to the additive element present in the double oxide are not limited to any specific range, respectively in the present invention. However, if the relative amount of cerium in the promoter is reduced, the resulting promoter has a tendency of exhibiting an insufficient effect. Contrary to this, if the relative amount of cerium in the promoter increases, there is observed such a tendency that the cerium is present not only in the form of a double oxide, but also in the form of cerium oxide, or that the amount thereof is too large to effectively deposit these compounds on the particulate aluminum oxide and this never results in the effect in proportion to the increase in the amount of cerium. Therefore, the component ratio of the particulate aluminum oxide to the double oxide is preferably on the order of about 1:0.5 to 1:4, as expressed in terms of weight ratio. On the other hand, the component ratio (weight ratio) of the cerium to the additive element present in the double oxide preferably falls within the range of from about 1:0.1 to 0.1:1 and more preferably 1:0.2 to 0.2:1, as expressed in terms of the reduced amount of oxides.

In the production method according to the present invention, a dispersion, which contains (i) a water-soluble salt of cerium and (ii) a water-soluble salt of at least one additive element, dissolved therein and particulate aluminum oxide dispersed therein is mixed with an aqueous solution of ammonium hydrogen carbonate and then reacted together. Such a dispersion may, for instance, be one prepared by dissolving a water-soluble salt of cerium and a water-soluble salt of at least one additive element in water and then dispersing particulate aluminum oxide in the resulting aqueous solution or one prepared by adding water to a mixture of a water-soluble salt of cerium, a water-soluble salt of at least one additive element and particulate aluminum oxide. After such an aqueous solution sufficiently penetrates even into fine pores present in the particulate aluminum oxide, the dispersion is mixed with the aqueous solution of ammonium hydrogen carbonate as a precipitant to thus cause a reaction between them. In this respect, these dispersion and aqueous solution may be mixed together by adding the former to the latter or by adding the latter to the former.

Alternatively, it is also possible, in the production method according to the present invention, to adhere, to the particulate aluminum oxide, an aqueous solution containing (i) a water-soluble salt of cerium and (ii) a water-soluble salt of at least one member selected from the group consisting of zirconium, yttrium, strontium, barium and rare earth metals; and to then bring the particulate aluminum oxide, to which the aqueous solution is adhered, into contact with an aqueous solution of ammonium hydrogen carbonate to thus cause a reaction of these solutions.

The particulate aluminum oxide carrying the aqueous solution may be prepared by dispersing the particulate aluminum oxide in the aqueous solution and after the aqueous solution completely or sufficiently penetrates into fine pores of the aluminum oxide particles, separating the particulate aluminum oxide through, for instance, filtration; or alternatively by placing the particulate aluminum oxide on a filtering medium and then adding the aqueous solution from the top of the filtering medium to pass the same through the particulate aluminum oxide layer and the filtering medium.

The aluminum oxide particles, to which the aqueous solution is adhered, may be brought into contact with the aqueous solution of ammonium hydrogen carbonate by, for instance, dispersing the former in the aqueous ammonium hydrogen carbonate solution or by placing the aluminum oxide particles, to which the aqueous solution is adhered, on a filtering medium and then running the aqueous ammonium hydrogen carbonate solution through the layer of the aluminum oxide particles.

In case where the aqueous solution is adhered to the particulate aluminum oxide, the aluminum oxide particles containing the aqueous solution is then brought into contact with the aqueous ammonium hydrogen carbonate solution to thus cause a reaction of these aqueous solutions, a problem arises, such that most of the reaction product of cerium and the additive element with ammonium hydrogen carbonate is adhered to the particulate aluminum oxide, but only a small amount of the reaction product is adhered to the aluminum oxide particles, since only a small quantity of the aqueous solution can be adhered to the particles. However, this problem can be eliminated to some extent, by increasing the concentrations of the water-soluble salts of cerium and the additive element to be added to the aqueous solution.

In either of the foregoing reactions, the reaction product containing cerium and the additive elements is deposited on the particulate aluminum oxide. The reaction product thus obtained may be a double salt, a double oxide or a mixture thereof depending on the reaction conditions selected. For instance, when the dispersion is added to the aqueous ammonium hydrogen carbonate solution, the reaction has a tendency to form a double oxide, while when the carbonate aqueous solution is added to the dispersion, the reaction is liable to form a double salt.

The kinds of the water-soluble salts used in the methods are not restricted to any specific one, but it is preferred to use nitrates, for the purpose of inhibiting any possible adverse effect of anionic impurities. Moreover, a variety of alkaline solutions are inspected for their effect as precipitants and compared with each other and as a result, it has been found that a good result can be ensured when using ammonium hydrogen carbonate.

In the production method according to the present invention, the relative amounts of the particulate aluminum oxide, the water-soluble salt of cerium and the water-soluble salt of the additive element are not restricted to any particular range. However, it is preferred to adjust the amounts of these components in such a manner that the component ratio of the particulate aluminum oxide to the double oxide in the promoter finally prepared and the component ratio of cerium to the additive element in the double oxide should fall within the preferred ranges specified above, respectively. In addition, the reaction temperature is not likewise restricted to any particular range, but it has been found that the reaction should be carried out with heating rather than at room temperature in order to obtain a double oxide showing high heat resistance.

The particulate aluminum oxide, to which the reaction product is adhered and which is prepared by the foregoing method, is then separated by, for instance, filtration, washed and then subjected to firing. If the reaction product is a double salt, the water and the carbonate are decomposed through the firing operation of the double salt to thus give a double oxide and the resulting double oxide is deposited on the particulate aluminum oxide. On the other hand, if the reaction product is a double oxide, the double oxide thus formed is supported on the particulate aluminum oxide during the firing step. In this respect, the firing temperature is not limited to any specific range and it is in general sufficient to fire the reaction product at a temperature ranging from 500 to 600° C. However, it is also possible to fire the product at a higher temperature and this permits the production of a promoter having improved thermal stability.

In the promoter for purifying the exhaust gas discharged from the internal combustion engines according to the present invention, the cerium-containing double salt is substituted for the cerium oxide conventionally used, unlike the conventionally used powdery mixture of cerium oxide and aluminum oxide and the double oxide is firmly adhered to the particulate aluminum oxide. For this reason, the resulting promoter has improved heat resistance, suppress any sintering even when it is exposed to a high temperature over a long period of time and can substantially prevent any quality reduction due to thermal deterioration. Furthermore, the particulate aluminum oxide is covered with the double oxide and therefore, the probability that the promoter comes in contact with exhaust gases.

The present invention will hereunder be described in more detail with reference to the following non-limitative working Examples and Comparative Examples.

EXAMPLE 1

Cerium nitrate (50 g; converted into the amount of $CeO_2$) and zirconium nitrate (50 g; converted into the amount of $ZrO_2$) were dissolved in water and the total volume of the solution was adjusted to 3 liters, then 50 g of γ-alumina (specific surface area: 150 $m^2$/g; average particle size: 18 μm) was added to the 3 liters of the aqueous solution, followed by sufficient mixing and dispersion. The resulting dispersion was dropwise added in small portions to a 3 liters of an aqueous solution containing 150 g of ammonium hydrogen carbonate dissolved therein, while stirring the mixture to thus cause a reaction between them. This reaction resulted in the formation of alumina particles coated with the reaction product containing cerium and zirconium. The reaction product was then sufficiently washed with water, followed by filtration, drying at 100° C. and further firing of the product at 600° C. for 3 hours to thus give alumina powder which supported a cerium and zirconium-containing double oxide.

Table 1 given below shows the component ratio of the resulting double oxide-supporting alumina powder (weight ratio of the amounts converted into oxides), average particle size and specific surface area for the product prior to the firing (described in the column entitled "before high temperature treatment" or "Before High Temp. Tr.") and for the powdery product obtained after subjecting a high temperature treatment at 1000° C. for 3 hours in the air (described in the column entitled "after high temperature treatment" or "After High Temp. Tr.").

The foregoing double oxide-supporting alumina powder prepared by firing at 600° C. for 3 hours, γ-alumina (specific surface area: 150 $m^2$/g; average particle size: 18 μm) and boehmite binder were weighed in such a manner that the. weight ratio of these three components was equal to 5:5:1, followed by sufficient mixing of these components together in a ball mill and further addition of water to the mixture to give a slurry.

The foregoing slurry was supported on a honeycomb of cordierite (diameter: 76 mm; length: 100 mm; 300 cells/$in^2$)

such that the amount of the supported slurry was equal to 160 g/l, followed by firing of the honeycomb at 500° C., then impregnation thereof with a noble metal solution containing 0.375 g of palladium and 0.075 g of rhodium to thus make all of the noble metals adhere to and support on the honeycomb. The honeycomb was again fired at 500° C. and then reduced with a reducing agent to give a noble metal-supporting catalyst.

The catalyst was subjected to a high temperature treatment at 1000° C. for 20 hours in the air so that the catalyst underwent thermal deterioration. The catalyst after the thermal deterioration was incorporated into a motorcar and determined the total amount of discharged contaminants present in the exhaust gas according to the 10–15 traveling mode. The results thus obtained are listed in the following Table 2. In addition, the catalyst-supporting layer after the thermal deterioration was peeled off and subjected to an X-ray diffraction analysis. As a result, it was found that the catalyst showed a single peak, which could be ascribed to $Ce_{0.5}Zr_{0.5}O_2$.

COMPARATIVE EXAMPLE 1

Gamma-alumina (specific surface area: 150 m$^2$/g; average particle size: 18 $\mu$m), cerium oxide, zirconium oxide and boehmite binder were weighed such that the weight ratio of these ingredients was set at 3:3:3:1, followed by sufficient mixing of these components together in a ball mill and the addition of water to the resulting mixture to give a slurry. The same procedures used in Example 1 were repeated except for the use of this slurry to give a noble metal-supporting catalyst. The total amount of the discharged contaminants present in the exhaust gas was determined by likewise repeating the same procedures used in Example 1 except for the use of the catalyst thus prepared. The results obtained are also summarized in Table 2. In addition, the catalyst-supporting layer after the thermal deterioration was peeled off and subjected to an X-ray diffraction analysis. As a result, it was found that the catalyst showed two separate peaks, which could be ascribed to $CeO_2$ and $ZrO_2$.

COMPARATIVE EXAMPLE 2

Cerium nitrate (50 g; converted into the amount of $CeO_2$) and zirconium nitrate (50 g; converted into the amount of $ZrO_2$) were dissolved in water and the total volume of the solution was adjusted to 3 liters, then 59 g of boehmite (average particle size: 6 $\mu$m) was added to the 3 liters of the aqueous solution in place of 50 g of the $\gamma$-alumina used in Example 1, followed by sufficient mixing and dispersion. The resulting dispersion was dropwise added in small portions to a 3 liters of an aqueous solution containing 150 g of ammonium hydrogen carbonate dissolved therein, while stirring the mixture to thus cause a reaction between them. This reaction resulted in the formation of boehmite particles coated with the reaction product containing cerium and zirconium. The reaction product was then sufficiently washed with water, followed by filtration, drying at 100° C. and further firing of the product at 600° C. for 3 hours to thus give boehmite powder.

Table 1 also shows the component ratio of the resulting powder (weight ratio of the amounts converted into oxides), average particle size and specific surface area for the product prior to the firing (described in the column entitled "before high temperature treatment" or "Before High Temp. Tr.") and for the powdery product obtained after subjecting a high temperature treatment at 1000° C. for 3 hours in the air (described in the column entitled "after high temperature treatment" or "After High Temp. Tr.").

The same procedures used in Example 1 were repeated except for the use of the powdery product thus prepared to give a noble metal-supporting catalyst. The total amount of the discharged contaminants present in the exhaust gas was determined by likewise repeating the same procedures used in Example 1 except for the use of the catalyst thus prepared. The results obtained are also summarized in Table 2.

COMPARATIVE EXAMPLE 3

Cerium nitrate (50 g; converted into the amount of $CeO_2$) and zirconium nitrate (50 g; converted into the amount of $ZrO_2$) were dissolved in water and the total volume of the solution was adjusted to 3 liters, then 59 g of boehmite (average particle size: 6 $\mu$m) was added to the 3 liters of the aqueous solution in place of 50 g of the $\gamma$-alumina used in Example 1, followed by sufficient mixing and dispersion. The resulting dispersion was dropwise added in small portions to a 1.5 liters of an aqueous solution of ammonia (ammonia: water=1:9), while stirring the mixture to thus cause a reaction between them. This reaction resulted in the formation of boehmite particles coated with the reaction product containing cerium and zirconium. The reaction product was then sufficiently washed with water, followed by filtration, drying at 100° C. and further firing of the product at 600° C. for 3 hours to thus give boehmite powder.

Table 1 also shows the component ratio of the resulting powder (weight ratio of the amounts converted into oxides), average particle size and specific surface area for the product prior to the firing (described in the column entitled "before high temperature treatment" or "Before High Temp. Tr.") and for the powdery product obtained after subjecting a high temperature treatment at 1000° C. for 3 hours in the air (described in the column entitled "after high temperature treatment" or "After High Temp. Tr.").

The same procedures used in Example 1 were repeated except for the use of the powdery product thus prepared to give a noble metal-supporting catalyst. The total amount of the discharged contaminants present in the exhaust gas was determined by likewise repeating the same procedures used in Example 1 except for the use of the catalyst thus prepared. The results obtained are also summarized in Table 2.

EXAMPLE 2

Cerium nitrate (50 g; converted into the amount of $CeO_2$) and lanthanum nitrate (50 g; converted into the amount of $La_2O_3$) were dissolved in water and the total volume of the solution was adjusted to 3 liters, then 50 g of $\gamma$-alumina (specific surface area: 150 m$^2$/g; average particle size: 18 $\mu$m) was added to the 3 liters of the aqueous solution, followed by sufficient mixing and dispersion. To the resulting dispersion, there was dropwise added in small portions a 3 liters of an aqueous solution containing 150 g of ammonium hydrogen carbonate dissolved therein, while stirring the mixture to thus cause a reaction between them. This reaction resulted in the formation of alumina particles coated with the reaction product containing cerium and lanthanum. The reaction product was then sufficiently washed with water, followed by filtration, drying at 100° C. and further firing of the product at 600° C. for 3 hours to thus give alumina powder which supported a cerium and lanthanum-containing double oxide.

Table 1 given below shows the component ratio of the resulting double oxide-supporting alumina powder (weight ratio of the amounts converted into oxides), average particle size and specific surface area for the product prior to the firing (described in the column entitled "before high temperature treatment" or "Before High Temp. Tr.") and for the powdery product obtained after subjecting a high temperature treatment at 1000° C. for 3 hours in the air (described in the column entitled "after high temperature treatment" or "After High Temp. Tr.").

The same procedures used in Example 1 were repeated except for the use of the powdery product thus prepared to give a noble metal-supporting catalyst. The total amount of the discharged contaminants present in the exhaust gas was determined by likewise repeating the same procedures used in Example 1 except for the use of the catalyst thus prepared. The results obtained are also summarized in Table 2.

EXAMPLE 3

Cerium nitrate (50 g; converted into the amount of $CeO_2$) and zirconium nitrate (50 g; converted into the amount of $La_2O_3$) were dissolved in water and the total volume of the solution was adjusted to 0.5 liters, then 50 g of γ-alumina (specific surface area: 150 m²/g; average particle size: 18 μm) was added to the 0.5 liters of the aqueous solution, followed by sufficient mixing and dispersion. The resulting dispersion was filtered and the powder thus recovered was dropwise added in small portions to a 3 liters of an aqueous solution containing 150 g of ammonium hydrogen carbonate dissolved therein, while stirring the mixture to thus cause a reaction between them. This reaction resulted in the formation of alumina particles coated with the reaction product containing cerium and zirconium. The reaction product was then sufficiently washed with water, followed by filtration, drying at 100° C. and further firing of the product at 600° C. for 3 hours to thus give alumina powder which supported a cerium and zirconium-containing double oxide.

Table 1 given below shows the component ratio of the resulting double oxide-supporting alumina powder (weight ratio of the amounts converted into oxides), average particle size and specific surface area for the product prior to the firing (described in the column entitled "before high temperature treatment" or "Before High Temp. Tr.") and for the powdery product obtained after subjecting a high temperature treatment at 1000° C. for 3 hours in the air (described in the column entitled "after high temperature treatment" or "After High Temp. Tr.").

TABLE 1

| | Component Ratio (weight ratio) $Al_2O_3$: $CeO_2$: $ZrO_2$ | Average Particle Size (μm) | Specific Surface Area (m²/g) | |
|---|---|---|---|---|
| | | | Before High Temp. Tr. | After High Temp. Tr. |
| Example 1 | 1.00: 0.91: 0.95 | 22 | 90 | 48 |
| Comp. Ex. 1 | — | — | — | — |
| Comp. Ex. 2 | 1.00: 1.08: 0.98 | 8 | 88 | 34 |
| Comp. Ex. 3 | 1.00: 1.05: 1.04 | 8 | 76 | 29 |
| Example 2 | 1.00: 1.12: 0.24 ($Al_2O_3$: $CeO_2$: $La_2O_3$) | 25 | 86 | 42 |
| Example 3 | 1.00: 0.41: 0.48 | 18 | 145 | 105 |

TABLE 2

| | Total Amount of Discharged Contaminants (g/km) | | |
|---|---|---|---|
| | CO | NOx | HC |
| Example 1 | 0.42 | 0.045 | 0.051 |
| Comparative Example 1 | 0.84 | 0.065 | 0.120 |
| Comparative Example 2 | 0.79 | 0.068 | 0.092 |
| Comparative Example 3 | 0.63 | 0.063 | 0.082 |
| Example 2 | 0.46 | 0.050 | 0.077 |

As will be clear from the data listed in Table 2, the total amount of discharged contaminants observed when using the catalyst prepared in Comparative Example 1 corresponds to 200% of carbon monoxide, 144% of nitrogen oxide and 235% of hydrocarbons, as compared with that observed when using the catalyst prepared in Example 1.

EXAMPLE 4 AND COMPARATIVE Example 4

The same procedures used in Example 2 were repeated except that nitrates of a variety of additive elements listed in the following Table 3 were substituted for the lanthanum nitrate used in Example 2 to give each corresponding double oxide-supporting alumina powder. The double oxide-supporting alumina powder was subjected to a high temperature treatment at 1000° C. for 3 hours in the air and then it was inspected for the specific surface area. Table 3 shows the kinds of the additive elements used and the specific surface areas observed after the high temperature treatment (After High Temp. Tr.).

TABLE 3

| | Additive Element | Specific Surface Area After High Temp. Tr. |
|---|---|---|
| Example 4 | Pr | 46 m²/g |
| | Nd | 43 m²/g |
| | Y | 41 m²/g |
| | Sr | 38 m²/g |
| | Ba | 32 m²/g |
| | Yb | 35 m²/g |
| Comparative Example 4 | V | 12 m²/g |
| | In | 16 m²/g |

As will be clear from the data listed in Table 3, it was confirmed that the same effect could be obtained by the use of a variety of rare earth metals, yttrium, strontium and barium in addition to zirconium and lanthanum, as the additive elements used in combination with cerium.

EXAMPLE 5 AND COMPARATIVE EXAMPLE 5

Various amounts of cerium nitrate and zirconium nitrate were dissolved in water and the total volume of each aqueous solution was adjusted to 3 liters. To this 3 liters of each aqueous solution, there was added 50 g of γ-alumina (specific surface area: 150 m²/g; average particle size: 18 μm) or 59 g of boehmite (average particle size: 6 μm), followed by sufficient mixing and dispersion. The resulting dispersions each was dropwise added in small portions to a 3 liters of an aqueous solution containing 150 g of ammonium hydrogen carbonate dissolved therein, while stirring the mixture to thus cause a reaction between them. This reaction resulted in the formation of alumina or boehmite particles coated with the reaction product containing cerium and zirconium. The reaction product was then sufficiently washed with water, followed by filtration, drying at 100° C. and further firing of the product at 600° C. for 3 hours to thus give alumina powder which supported a cerium and zirconium-containing double oxide.

Table 4 given below shows the component ratios of the resulting double oxide-supporting alumina powder (weight ratio of the amounts converted into oxides), and specific surface area for the powdery product obtained after subjecting it to a high temperature treatment at 1000° C. for 3 hours in the air.

TABLE 4

| | Component Ratio (weight ratio) $Al_2O_3:CeO_2:ZrO_2$ | Aluminum Oxide | Specific Surfac Area After Hig Temp. Tr. |
|---|---|---|---|
| Example 5 | 1.0:1.0:0.1 | γ-alumina | 38 m²/g |
| | 1.0:1.0:0.5 | | 43 m²/g |
| | 1.0:0.5:0.5 | | 46 m²/g |
| | 1.0:0.2:1.0 | | 41 m²g |
| | 1.0:2.5:1.0 | | 39 m²g |
| | 1.0:3.5:1.0 | | 30 m²g |
| Comparative Example 5 | 1.0:1.0:0.0 | γ-alumina | 18 m²g |
| | 1.0:3.5:0.0 | | 19 m²/g |
| | 1.0:1.0:0.1 | bochmite | 12 m²g |
| | 1.0:2.5:1.0 | | 6 m²/g |

The data shown in Table 4 clearly indicate that the product of the present invention maintains its high specific surface area even after subjecting it to a high temperature treatment at 1000° C. for 3 hours in the air when the weight ratio of cerium oxide to zirconium oxide falls within the range of from 1:0.1 to 0.1:1, in particular 1:0.2 to 0.2:1 and the weight ratio of alumina to the double oxide ranges from 1:0.5 to 1:4.

On the other hand, when boehmite is used, while using the same composition defined above, there is observed a reduction of the specific surface area in the both cases and it was thus confirmed that alumina, in particular, alumina having an average particle size of not less than 10 μm is preferably used in the present invention.

What is claimed is:

1. A promoter for purifying internal combustion engine exhaust gas consisting essentially of:

(A) particulate aluminum oxide; and
   (B) a double oxide of (i) cerium and (ii) at least one member selected from the group consisting of zirconium, yttrium, strontium, barium and rare earth elements, coated on the particulate aluminum oxide;
   wherein the particulate aluminum oxide has an average particle size of not less than 10 μm; and
   wherein the component ratio of the aluminum oxide to the double oxide ranges from 1:0.5 to 1:4, as expressed in terms of the weight ratio, and the component ratio of the cerium present in the double oxide to the at least one member selected from the group consisting of zirconium, yttrium, strontium, barium and rare earth elements ranges from 1:0.1 to 0.1:1, as expressed in terms of the weight ratio of reduced amounts of the oxides thereof.

2. The promoter for purifying internal combustion engine exhaust gas as set forth in claim 1 wherein the component ratio of the cerium present in the double oxide to the at least one member selected from the group consisting of zirconium, yttrium, strontium, barium and rare earth elements ranges from 1:0.2 to 0.2:1, as expressed in terms of the weight ratio of reduced amounts of the oxides thereof.

3. A method for preparing the promoter for purifying internal combustion engine exhaust gas as set forth in claim 2, the method comprising the steps of:

forming a solution of (i) a water-soluble salt of cerium and (ii) a water-soluble salt of at least one member selected from the group consisting of zirconium, yttrium, strontium, barium and rare earth elements;
   adding particulate aluminum oxide to the solution to form a dispersion;
   adding an aqueous solution of ammonium hydrogen carbonate to the dispersion to cause a reaction to obtain particulate aluminum oxide coated with a reaction product; and
   firing the particulate aluminum oxide to which the reaction product is adhered to thus give the promoter which consists essentially of the particulate aluminum oxide and the double oxide of (i) cerium and (ii) at least one member selected from the group consisting of zirconium, yttrium, strontium, barium and rare earth elements, coated on the aluminum oxide.

4. A method for preparing the promoter for purifying internal combustion engine exhaust gas as set forth in claim 2, the method comprising the steps of:

adhering, onto particulate aluminum oxide, an aqueous solution, which contains (i) a water-soluble salt of cerium and (ii) a water-soluble salt of at least one member selected from the group consisting of zirconium, yttrium, strontium, barium and rare earth elements dissolved therein;
   bringing the particulate aluminum oxide provided thereon with the aqueous solution adhered thereto into contact with an aqueous solution of ammonium hydrogen carbonate to cause a reaction between these solutions and to thus deposit a reaction product on the particulate aluminum oxide; and
   firing the particulate aluminum oxide to which the reaction product is adhered to thus give the promoter which consists essentially of the particulate aluminum oxide and the double oxide group consisting of zirconium, yttrium, strontium, barium and rare earth elements, coated on the aluminum oxide.

5. A method for preparing the promoter for purifying internal combustion engine exhaust gas as set forth in claim 1, the method comprising the steps of:

forming a solution of (i) a water-soluble salt of cerium and (ii) a water-soluble salt of at least one member selected from the group consisting of zirconium, yttrium, strontium, barium and rare earth elements;
   adding particulate aluminum oxide to the solution to form a dispersion;
   adding an aqueous solution of ammonium hydrogen carbonate to the dispersion to cause a reaction to obtain particulate aluminum oxide coated with a reaction product; and
   firing the particulate aluminum oxide to which the reaction product is adhered to thus give the promoter which consists essentially of the particulate aluminum oxide and the double oxide of (i) cerium and (ii) at least one member selected from the group consisting of zirconium, yttrium, strontium, barium and rare earth elements, coated on the aluminum oxide.

6. A method for preparing the promoter for purifying internal combustion engine exhaust gas as set forth in claim 1, the method comprising the steps of:

adhering, onto particulate aluminum oxide, an aqueous solution, which contains (i) a water-soluble salt of cerium and (ii) a water-soluble salt of at least one member selected from the group consisting of zirconium, yttrium, strontium, barium and rare earth elements dissolved therein;

bringing the particulate aluminum oxide provided thereon with the aqueous solution adhered thereto into contact with an aqueous solution of ammonium hydrogen carbonate to cause a reaction between these solutions and to thus deposit a reaction product on the particulate aluminum oxide; and firing the particulate aluminum oxide to which the reaction product is adhered to thus give the promoter which consists essentially of the particulate aluminum oxide and the double oxide of (i) cerium and (ii) at least one member selected from the group consisting of zirconium, yttrium, strontium, barium and rare earth elements, coated on the aluminum oxide.

* * * * *